(No Model.)
W. WIGHTMAN.
MILK COOLER.
No. 448,869. Patented Mar. 24, 1891.
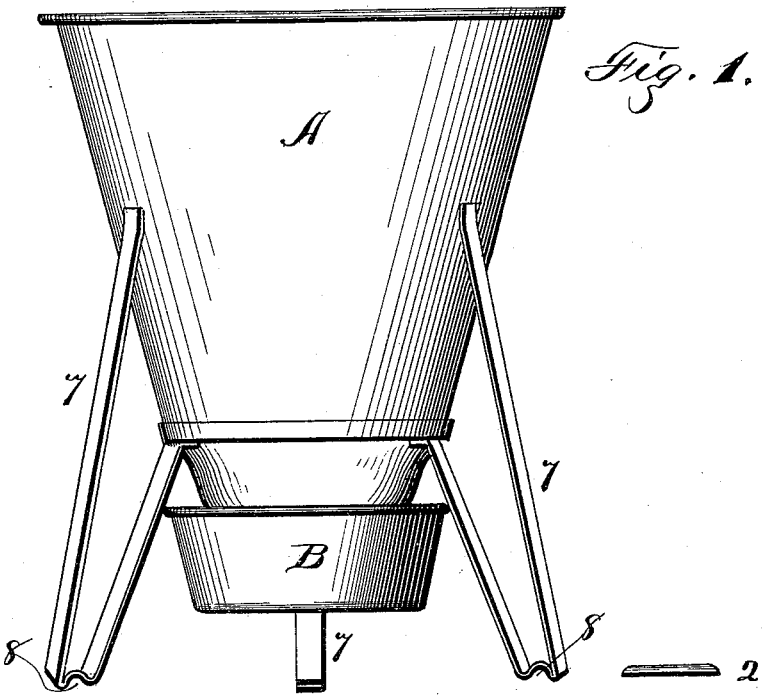
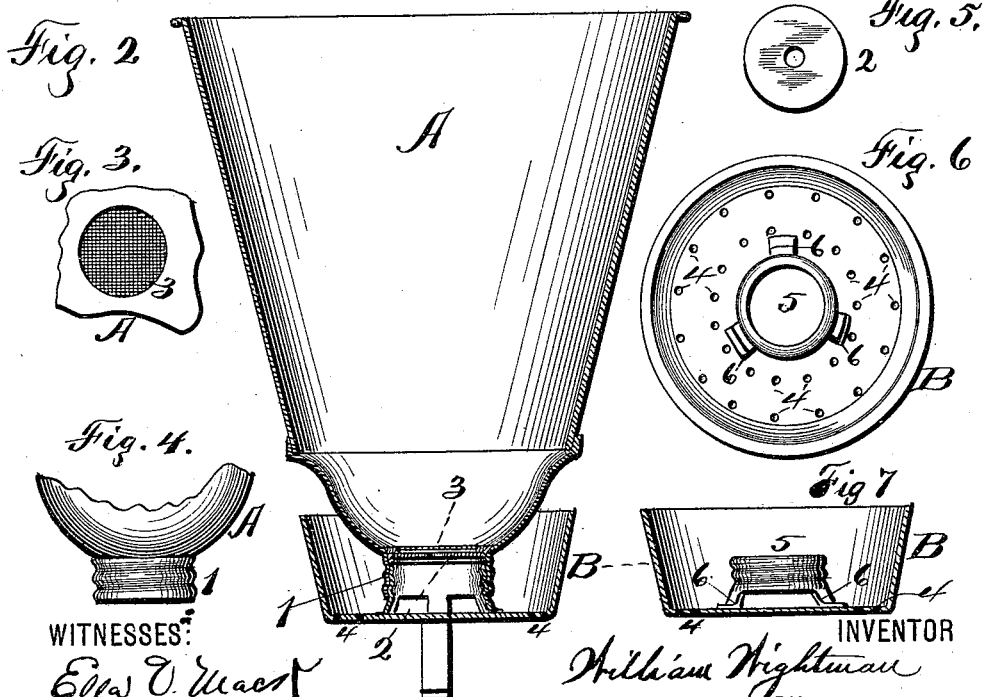
WITNESSES:
INVENTOR
William Wightman
BY
Smith & Denison
his ATTORNEYS

UNITED STATES PATENT OFFICE.

WILLIAM WIGHTMAN, OF PULASKI, NEW YORK.

MILK-COOLER.

SPECIFICATION forming part of Letters Patent No. 448,869, dated March 24, 1891.

Application filed July 21, 1890. Serial No. 359,368. (No model.)

*To all whom it may concern:*

Be it known that I, WILLIAM WIGHTMAN, of Pulaski, in the county of Oswego, in the State of New York, have invented new and useful Improvements in Milk-Coolers, of which the following, taken in connection with the accompanying drawings, is a full, clear, and exact description.

My invention relates to means and appliances for cooling milk and aerating it.

My object is to more perfectly cool and aerate it, more fully remove the animal heat and odor, and to improve the qualities and better preserve it by means which strain, cool, and aerate simultaneously, and means which regulate the flow of milk from the strainer.

My invention consists in the several novel features of construction and operation, which are hereinafter described, and which are specifically set forth in the claim hereto annexed. It is constructed as follows, reference being had to the accompanying drawings, in which—

Figure 1 is a side elevation. Fig. 2 is a vertical transverse section. Fig. 3 is a plan of the strainer. Fig. 4 is a detail of the lower end of the reservoir. Fig. 5 shows a side elevation and a plan view of the regulating-washer. Fig. 6 is a top plan of the receiver. Fig. 7 is a sectional elevation of same.

A is the reservoir, of any form desired, having its lower end contracted and provided with a tubular screw-extension 1. In the upper end of this extension I removably insert a flat, or, preferably, downwardly-concaved disk 2, having a central aperture, and above this I removably mount a strainer 3.

B is a milk-receiver consisting of a pan provided with perforations 4 in its bottom and having a tubular screw 5 mounted in it centrally upon legs 6, which support it in a position detached from the bottom, the screw fitting into or over the extension 1, so that when screwed up the pan is supported under the reservoir in such position as to catch the milk as strained, and from this pan it percolates or trickles through the perforations into a can or other receptacle below. The size of the aperture in the disk retards the flow of the milk through the strainer, so that it strains better and more thoroughly, and it also regulates the flow into the pan. The size of this aperture can be varied by having different disks with apertures varying in size. The perforations 4 also operate to spread and divide the milk into tiny streams. Legs 7 are secured to the exterior of the reservoir, and their lower ends are concaved or provided with jaws 8, which are adapted to fit over the upper edge of a milk-can and support the cooler thereon.

What I claim as my invention, and desire to secure by Letters Patent, is—

A milk-cooler comprising a reservoir, a strainer in its lower end, a tubular threaded extension below the reservoir, a disk having a central aperture removably mounted within the extension, a pan detachably suspended from the extension and having a perforated bottom, and legs to support the cooler, in combination, as set forth.

In witness whereof I have hereunto set my hand this 19th day of July, 1890.

WILLIAM WIGHTMAN.

In presence of—
   H. P. DENISON,
   E. V. MACK.